United States Patent [19]
Niedl

[11] Patent Number: 6,023,847
[45] Date of Patent: Feb. 15, 2000

[54] APPARATUS FOR CUTTING VEGETATION

[76] Inventor: Hans Niedl, Laimgruberstrasse 6, D-83365 Sondermoning, Germany

[21] Appl. No.: 09/136,466

[22] Filed: Aug. 19, 1998

[30] Foreign Application Priority Data

Aug. 20, 1997 [DE] Germany .......................... 197 36 206

[51] Int. Cl.⁷ ............................................. A01D 34/68
[52] U.S. Cl. .............................. 30/276; 30/347; 56/12.7
[58] Field of Search ........................... 30/347, 276, 286; 56/12.7, 295

[56] References Cited

U.S. PATENT DOCUMENTS

| | | | |
|---|---|---|---|
| 4,020,552 | 5/1977 | Mizuno et al. | 30/276 |
| 4,062,114 | 12/1977 | Luick | 30/347 |
| 4,097,991 | 7/1978 | Proulx | 30/276 |
| 4,114,269 | 9/1978 | Ballas, Sr. | 30/276 |
| 4,124,938 | 11/1978 | Ballas, Sr. | 30/276 |
| 4,161,820 | 7/1979 | Moore | 30/276 |
| 4,236,309 | 12/1980 | Cayou | 30/276 |
| 4,276,691 | 7/1981 | Palmieri et al. | 30/347 |
| 4,349,962 | 9/1982 | Itagaki et al. | 30/347 X |
| 4,426,780 | 1/1984 | Foster | 30/347 X |
| 4,630,371 | 12/1986 | Graham | 30/347 |
| 4,926,557 | 5/1990 | Haupt | 30/347 X |
| 4,942,664 | 7/1990 | Zatulovsky | 30/276 |
| 5,890,352 | 4/1999 | Molina | 30/276 X |

*Primary Examiner*—Rinaldi I. Rada
*Assistant Examiner*—Dominic J Troiano
*Attorney, Agent, or Firm*—Flynn, Thiel, Boutell & Tanis, P.C.

[57] ABSTRACT

An apparatus for cutting vegetation that includes a fixed gearhead from which a rotating driveshaft extends. A spool, including a spool housing and a spool element, are located below the gearhead and are coupled to the drive shaft to rotate in unison with the drive shaft. A cylindrically shaped deflecting ring extends between the top of the spool housing and the adjacent rotating protective disk. The deflecting ring prevents cut vegetation from winding around the portion of the driveshaft that extends between the gearhead and the spool.

5 Claims, 2 Drawing Sheets

APPARATUS FOR CUTTING VEGETATION

FIELD OF THE INVENTION

This invention relates to an apparatus for cutting vegetation.

BACKGROUND OF THE INVENTION

Apparatuses for cutting vegetation have been available commercially for years. They are also-called motor scythes and are used in particular for trimming grass in edge areas. The spool of such an apparatus can be found for example in U.S. Pat. No. 4,097,991.

In order to adjust the constantly wearing cutting thread to the desired working length, the spool element in such an apparatus is drawn downward against the force of the spring, causing the pegs on the spool element to be drawn out of the recesses in the spool housing so that the spool element can be rotated and the cutting thread, for example a plastic thread, thus unwound. When enough thread has been unwound, the spool element is locked to the spool housing so as to rotate in unison again by engagement of the pegs in the recesses.

The spring, which loads the spool element against the spool housing and thus holds the pegs in the recesses, at the same time presses the spool housing against the polygon on the driving pin which connects the spool housing with the driveshaft so as to rotate in unison. Grass stalks and similar plant parts unavoidably wind themselves in the narrow gap between the spool housing and the protective disk around the driveshaft. Increasing winding around the driveshaft causes the spool housing to be pushed downward away from the gearhead and thus the spring to be more and more compressed. The compression of the spring can become so great that one can no longer draw the spool element downward far enough to unlock it from the spool housing by disengaging the pegs from the recesses when one wants to adjust the cutting thread. One ten has no choice but to unscrew the nut at the lower end of the driving pin and take off the spool to remove the firmly wedged grass wound around the driveshaft.

If one is mowing in an area with hard objects such as stones or a wire fence, the cutting thread is worn especially greatly. It can then happen that the cutting thread must be adjusted every few minutes but the release between spool element and spool housing is blocked by jammed grass stalks. One must then frequently spend more time cleaning the driveshaft than actually mowing.

Apparatuses are also known wherein the spool with the cutting thread can be replaced by another cutting tool, e.g. a so-called grass striking plate which is formed like a circular saw blade. In apparatuses which can be equipped with such a grass striking plate, a pressure disk permitting the striking plate to be clamped in presses against the protective disk from below.

SUMMARY OF THE INVENTION

The purpose of the invention is to prevent blocking of the release between spool element and spool housing by grass stalks or similar plant parts wound around the driveshaft.

An inventive plant deflecting ring prevents grass stalks and similar plant parts from passing into the gap between the protective disk or pressure disk and the spool housing At the same time the plant deflecting ring has a smooth cylindrical circumferential surface so that no plant parts can collect thereon. This reliably prevents blocking of the release between the spool element and the spool housing.

The ring preferably consists of a plastic sheath accordingly cut to size. It lies flush on the protective disk. The spring compressed the protective ring against the protective disk associated with the gearhead and against the gearhead-side wall of the spool housing. The plant deflecting ring is preferably centered by a smaller-diameter coaxial disk on the protective disk, said smaller-diameter disk being slipped onto the driveshaft. The plant deflecting ring is slipped with its upper end on this smaller-diameter disk.

In apparatuses which can be retrofitted to a striking plate, the slightly conic pressure disk for clamping the striking plate to the protective disk is preferably used for centering the plant deflecting ring.

BRIEF DESCRIPTION OF THE DRAWINGS

The following an embodiment of the invention will be explained in more detail with reference to the drawings, in which.

DETAILED DESCRIPTION

Figure 1:
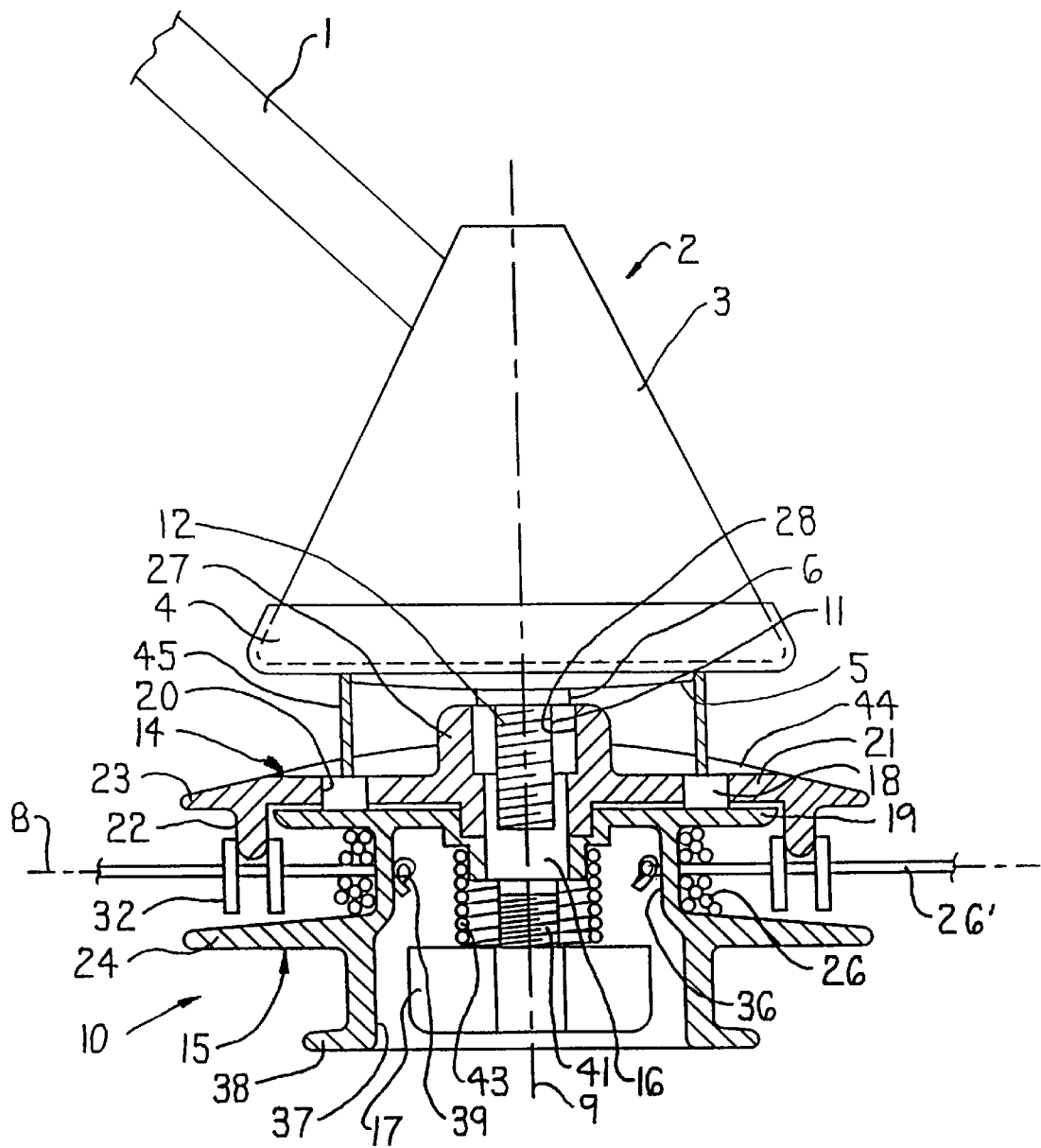
FIG. 1 shows the gearhead and, in cross section, the spool of a known commercial apparatus with an embodiment of the inventive plant deflecting ring.
Figure 2:
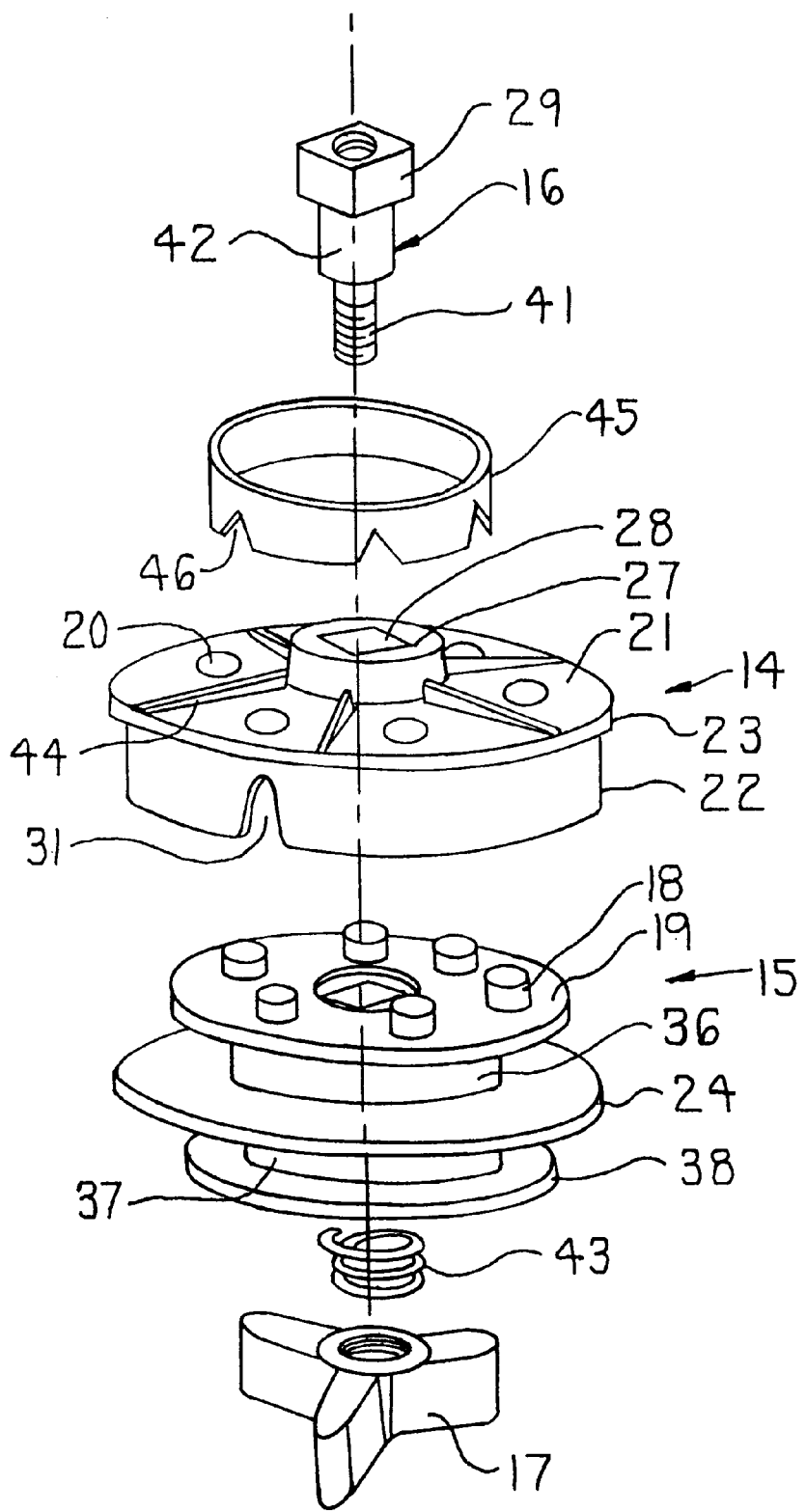
FIG. 2 shows an exploded view of the spool and plant deflecting ring of FIG. 1.

The apparatus has tubular housing 1 which is provided at the upper end (not shown) with handles and a motor and through which a driveshaft (not shown) extends to gearhead 2 in housing 3 at the lower end. The lower end of downwardly flaring housing 3 is closed by protective disk 4 engaging around the lower edge of housing 3 with an upwardly bent edge.

Lying against protective disk 4 is smaller-diameter pressure disk 5. Protective disk 4 and pressure disk 5 are penetrated by driveshaft 6 in housing 3. The shaft extends substantially perpendicular to cutting plane 8 and at the same time forming rotation axis 9 for spool 10.

Protective disk 4 and pressure disk 5 are connected with driveshaft 6 so as to rotate in unison. The lower end of driveshaft 6 protruding out of gearhead housing 3 is provided with screw thread 11 onto which driving pin 16 provided with internal thread 12 is screwed, thereby pressing pressure disk 5 and protective disk 4 against a collar (not shown) on shaft 6 in gearhead housing 3.

Spool 10 consists substantially of spool housing 14 rotatable around rotation axis 9 and spool element 15 inserted into spool housing 14. Spool housing 14 and spool element 15 are held together by driving pin 16 and nut 17 formed as a star nut and are interconnected so as to rotate in unison by six pegs 18 extending upward from upper flange 19 of spool element 15 and engaging six corresponding recesses 20 in upper, gearhead-side wall 21 of spool housing 14.

Spool housing 14 consists of upper wall 21 and cylindrical circumferential wall 22. Upper wall extends beyond circumferential wall 22 so as to form flange 23 outward. Flange 23 and middle flange 24 of spool element 15 likewise extending outward over circumferential wall 22 protect cutting thread 26.

From upper wall 21 of spool housing 14 boss 27 extends upward in the middle. Boss 27 has polygonal, e.g. square, inside recess 28 for receiving corresponding polygon or square 29 on driving pin 16. Polygon 29 in corresponding inside recess 28 connects driving pin 16 with spool housing 14 so that they rotate in unison.

In cylindrical circumferential wall 22 of spool housing 14 there are two slots 31 receiving sheaths 32 through which one cutting thread 26 is guided in each case, whereby cutting portions 26' of cutting thread 26 protruding out of spool housing 14 spin around rotation axis 9 during trimming.

Between upper flange 19 and middle flange 24, spool element 15 has cylindrical portion 36. Further cylindrical portion 37 extends from middle flange 24 downward to lower flange 38. Cylindrical portion 36 serves to wind on a supply of the two cutting threads 26 which are fastened to spool element 15 with knots 39.

Driving pin 16 has cylindrical portion 42 between polygon 29 and screw thread 41 at the lower end onto which star nut 17 is screwed. Around driving pin 16 there is coil spring 43 which is supported on the one hand on star nut 17 and on the other hand on upper flange 19 of spool element 15.

When cutting portion 26' of cutting thread 26 is worn out and must be adjusted, spool element 15 is drawn downward and rotated relative to spool housing 14 to unwind thread 26 from spool element 15. To accomplish this, initially star nut 17 is loosened. Then, spool housing 14 and spool element 15 are shifted axially relative to each other by drawing pegs 18 out of recesses 20 so as to pay out additional cutting thread. After corresponding rotation of spool element 15 with respect to spool housing 14 pegs 18 engage recesses 20 in the new angular position. Star nut 17 is then tightened again, putting spool 10 back in its working position.

Spool 10 can be unscrewed from gearhead 2. For this purpose, driving pin 16 provided with polygon 29 is unscrewed from screw thread 11 at the lower end of driveshaft 6.

Upper wall 21 of spool housing 14 is provided with radially extending reinforcing ribs 44.

Between protective disk 4 and upper, gearhead-side wall 21 of spool housing 14 there is cylindrical plant deflecting ring 45. Sheath-shaped or cylindrical plant deflecting ring 45 lies with its upper front edge against protective disk 4. With its lower front edge it is supported on upper wall 21 of spool housing 14.

For centering, plant deflecting ring 45 is slipped onto pressure disk 5 on protective disk 4. That is, it has at least on this face an inside diameter corresponding to the outside diameter of pressure disk 5. On its lower face, plant deflecting ring 45 is provided with gaps or notches 46 through which reinforcing ribs 44 extend on upper wall 21 of spool housing 14.

What is claimed is:

1. An apparatus for cutting vegetation along a cutting plane, said apparatus having:

a spool rotating around a rotation axis extending substantially perpendicular to the cutting plane, said spool including a spool housing with an inserted spool element onto which at least two cutting threads are wound, each said cutting thread protruding out of the spool housing with an unwound cutting portion able to spin around the rotation axis in the cutting plane; and a gearhead located above the spool housing, the gearhead having a rotating driveshaft directed to the spool and a protective disk that covers the portion of the gearhead adjacent the spool, wherein the driveshaft and the protective disk are fastened together so as to rotate in unison, wherein the spool element is provided with pegs which engage recesses formed in the spool housing and is displaceable away from the spool housing along a driving pin connected coaxially with the driveshaft for adjusting the cutting portions of the cutting threads, a spring is provided which, at one end, abuts a nut which is screwed onto a threaded portion of the driving pin and, at a second end opposed to the first end, presses the spool element against the spool housing and the spool housing is mounted axially displaceably on the driving pin and cooperates with a polygon on the driving pin to rotate in unison with the driving pin, the improvement comprising:

a plant deflecting ring is provided which is coaxial with the rotation axis and which has a first face positioned against the protective disk on the gearhead and a second face opposite the first face which is positioned against an adjacent wall of the spool housing.

2. The apparatus of claim 1, wherein said plant deflecting ring is formed as a cylindrical sheath.

3. The apparatus of claim 1, wherein said plant deflecting ring fits over a supplemental disk that is disposed over and that is coaxial with said protective disk so that said plant deflecting ring is centered by said supplemental disk.

4. The apparatus of claim 3, wherein said supplemental disk is a pressure disk having a conic profile.

5. The apparatus of claim 1, wherein said wall of the spool housing adjacent the gearhead has radially extending reinforcing ribs directed toward the gearhead and the plant deflecting ring is provided with gaps in which the reinforcing ribs are seated.

* * * * *